Patented Mar. 13, 1951

2,544,904

UNITED STATES PATENT OFFICE 2,544,904

PYRIDINE COMPOUNDS AND METHOD FOR THEIR PRODUCTION

Norbert Steiger, Nutley, N. J., assignor to Hoffmann-La Roche Inc., Nutley, N. J., a corporation of New Jersey No Drawing. Application October 1, 1946, Serial No. 700,377

12 Claims. (Cl. 260—270)

This invention relates to new chemical compounds and their method of production, as well as to compositions in which such compounds are employed. More particularly, the invention relates to new pyridine compounds and especially to 3-pyridine-thiols, and salts thereof, and to bactericidal and fungicidal preparations comprising these compounds.

The 3-pyridine-thiol can be represented by the following formula:

(I) 

Salts with acids, as for example, the hydrochloride, and double salts with acids and metal halides as, for example, the hydrochloride-tin-tetrachloride double salts can be prepared from the 3-pyridine-thiol. These can be represented by the following formulae:

(II) 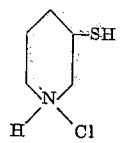

and (III) 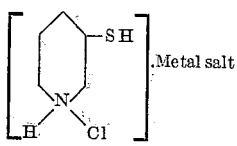

as for example, (IV) 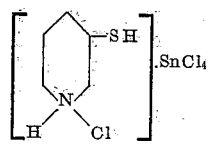

Metal derivatives or salts in the nature of mercaptides of 3-pyridine-thiol can also be prepared and can be represented by the following illustrative formula:

(V) 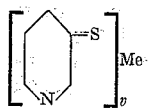

where $v$ is the valence of the metal.

It will be understood that the term "salts" as employed in the descriptive portion of the specification and in the claims covers the various forms mentioned above.

The novel compounds, particularly the metal derivatives or mercaptides, exhibit fungicidal and bactericidal activity. It has been found that the compounds are especially suitable for the treatment of pathogenic fungi infections. However, the compounds are also useful for other purposes, for instance, as intermediates as will appear hereinafter.

The new compounds especially in the form of the mercaptides can be employed to prepare various compositions which are highly effective in the treatment of fungus infections of the epidermis. For this purpose the compounds are generally employed with a suitable carrier, diluent or base as, for example, talc, magnesium silicate and other carriers to form dusting powders. Where it is desired to employ them in the form of ointments, the compounds are mixed in a suitable ointment base as, for example, a hydrophilic ointment containing complex high molecular hydroxyl animal fats.

The 3-pyridine-thiol can be prepared from the known compound 3-pyridine-sulfochloride hydrochloride. The 3-pyridine-sulfochloride hydrochloride can be prepared by a method shown by F. E. Reinhart in Journal of the Franklin Institute, 236, 316–320 (1943). I have found that this sulfochloride can readily be reduced to 3-pyridine-thiol by the addition of the sulfochloride to a solution of stannous chloride in concentrated hydrochloric acid. After a short interval of time, a reaction product in the form of a stannic chloride double salt crystallizes. This salt, in the cold, is not appreciably soluble in concentrated hydrochloric acid, and can be filtered off and dried in vacuo if desired. To liberate the hydrochloric of the 3-pyridine-thiol, the stannic chloride double salt is added to an aqueous solution of sodium sulfide used in excess. The double salt thereupon goes into solution. To this solution there is then added dilute hydrochloric acid to Congo red acidity, and the whole brought to a boil until most of the hydrogen sulfide is driven off and the tin completely precipitated as yellow stannic sulfide ($SnS_2$). The filtrate, which contains the hydrochloride of 3-pyridine-thiol, is added to an aqueous solution of zinc chloride and a mineral acid binding agent, as for example an alkali metal salt of an organic acid, such as sodium acetate. There is formed a zinc derivative or mercaptide of 3-pyridine-thiol, which compound is filtered off, washed with cold water to remove inorganic salts, and dried in vacuo. It is of almost white color.

The reactions involved can be represented by the following scheme:

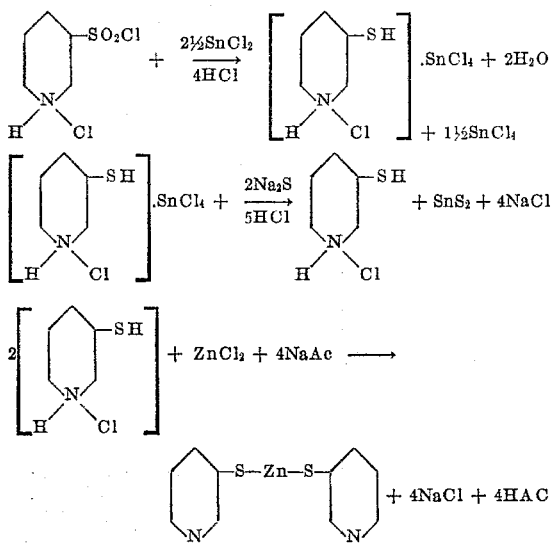

Other metal derivatives can also be formed instead of the zinc derivative. Thus, derivatives of mercury, gold, cadmium, bismuth, iron, lead and copper can be prepared in an analogous manner. Derivatives of alkali metals and alkali earth metals such as sodium, potassium, calcium and magnesium can also be prepared.

If desired, the free pyridine-thiol can be obtained from the hydrochloride of the 3-pyridine-thiol in solution form by making the solution alkaline to phenolphthalein with sodium hydroxide solution, and thereafter making the solution faintly acid with acetic acid. The solution is then extracted with chloroform. The chloroform is distilled off and the residue crystallized from benzene and petroleum ether. There are thus obtained flat yellow plates of 3-pyridine-thiol, M. P. 75–77° C. The 3-pyridine-thiol is readily soluble in cold water, and also in normal NaOH or KOH solutions forming the corresponding sodium and potassium derivatives or mercaptides. It is also soluble in $Ca(OH)_2$ or $Mg(OH)_2$ solutions forming the water-soluble calcium and magnesium derivatives.

The double salts, as, for instance, the tin-tetrachloride double salt, can be employed as starting materials in a new synthesis for preparing 3-pyridyl-thioglycollic acid which is identical with the acid prepared by Tschitschibabin from 3-amino-pyridine in a different way. (Berichte 1933, p. 369.) This new synthesis is illustrated by the following procedure: the tin-tetrachloride-double salt is added to an aqueous NaOH solution of monochloracetic acid at room temperature. The condensation product is acidified with HCl to a pH of 4.5, the precipitate formed is filtered and the filter cake extracted with dilute sodium acetate solution. The extract is acidified to a pH of 4.5, filtered and the cake crystallized from water. The product obtained is 3-pyridyl-thioglycollic acid.

The following examples illustrate the preparation of the 3-pyridine-thiol, as well as the salts thereof. It will be understood that the reactants, quantities thereof, as well as procedural details are merely illustrative. Modifications will be apparent to those skilled in the art.

EXAMPLE 1

To a solution of 600 grams $SnCl_2$ in 800 cc. of concentrated HCl were added with agitation in small portions, 215 grams of 3-pyridine-sulfochloride hydrochloride. The temperature was permitted to rise to 60–70° C. After all of the 3-pyridine compound was added, 50 grams $SnCl_2$ were added and the reaction mixture stirred for one hour at 50–55° C. In a short time the $SnCl_4$-double salt of the 3-pyridine-thiol began to crystallize. After completion of the reduction, the reaction mixture was chilled to +5° C. and allowed to crystallize. After 24 hours the mixture is filtered on a fritted funnel and washed with 100 cc. of concentrated HCl and sucked dry on the funnel. The compound obtained can be represented by the following formula and is the tin-tetrachloride double salt of 3-pyridine-thiol hydrochloride.

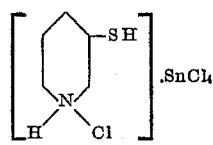

EXAMPLE 2

To a solution of 280 grams of $Na_2S$ concentrated in 900 cc. of water there is added with stirring the above-described $SnCl_4$-double salt, which goes into solution. To this is added in small portions dilute HCl acid, made up from 230 cc. of concentrated HCl and 600 cc. of water. The stannic sulfide precipitates. The mixture is then heated to the boil, nitrogen is passed through to drive off the $H_2S$, and heating continued for about 30 minutes. It is then filtered hot, washed with some dilute HCl and finally with water. The filtrate which contains in solution 3-pyridine-thiol hydrochloride (if desired the 3-pyridine-thiol hydrochloride can be isolated by evaporation of the water) is run into a solution of 100 grams of $ZnCl_2$ and 120 grams of sodium acetate in 700 cc. of water. The zinc derivative or mercaptide of 3-pyridine-thiol precipitates. It has a white color. It is filtered, washed with ice water and dried in vacuo. The compound obtained can be represented by the following formula:

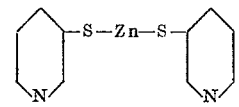

EXAMPLE 3

41 grams of the $SnCl_4$ double salt described in Example 1 are dissolved in a solution of 50 grams of $Na_2S$ concentrated and 200 cc. of water at 90° C. To the solution is added 100 cc. of a diluted HCl (made up from 45 cc. HCl concentrated and 55 cc. water) to precipitate the tin as $SnS_2$. The reaction mixture is heated to the boil for ½ hour, then filtered hot.

The filtrate which contains the hydrochloride of 3-pyridine-thiol, is added to a solution of 17 grams of mercuric acetate in 10 cc. of glacial acetic acid, 150 cc. water and 30 grams sodium acetate. The white mercuric derivative of 3-pyridine-thiol precipitates immediately. It is filtered, washed with water and dried.

When dried, it is a white powder, insoluble in water and organic solvents. It can be represented by the following formula:

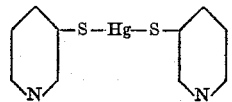

EXAMPLE 4

22 grams of the SnCl₄-double salt described in Example 1 are dissolved in a solution of 28 grams of Na₂S concentrated and 60 cc. of water at 90° C. To this is added 80 cc. of a diluted HCl (made up from 30 cc. HCl concentrated and 50 cc. water) to precipitate the tin as SnS₂. The mixture is heated to 95° C. then filtered hot. The filtrate is run into a solution of 10 grams of cupric acetate in 250 cc. of water, to which were added 2 cc. of glacial acetic acid and 40 g. of Na-acetate. The greenish copper derivative precipitates. It is filtered, washed with water and dried. When dried it is a greenish-gray powder, insoluble in water and organic solvents. It can be represented by the following formula:

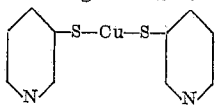

EXAMPLE 5

(a) 40 grams of SnCl₄-double salt described in Example 1 are dissolved in a solution of 55 grams of Na₂S concentrated and 120 cc. water at 90° C. This solution was poured into 60 cc. of HCl concentrated and 100 cc. water, heated to the boil and filtered. The filtrate was added to a solution of 16 grams of BiCl₃ in 25 cc. of HCl concentrated. To the clear yellow solution obtained there were added 50 cc. of HCl concentrated, and the mixture allowed to crystallize while cooling for 24 hours. The yellow BiCl₃-double salt was filtered off on a fritted glass funnel and dried in presence of NaOH-flakes. It can be represented by the following structural formula:

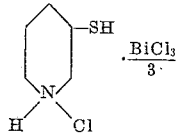

(b) A solution of 3-pyridine-thiol hydrochloride was prepared from 22 grams of the SnCl₄-double salt as describ in Example 4. This solution was added to a solution of 5.5 grams BiCl₃ in 10 cc. HCl concentrated. The clear yellow solution obtained was added dropwise to a well-stirred solution of 50 grams Na-acetate in 300 cc. water. The bismuth compound precipitates with orange colour. It is filtered and dried in vacuo. The dry product is of orange colour, insoluble in water and organic solvents. The compound can be represented by the following formula:

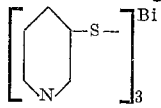

EXAMPLE 6

20 grams of the zinc derivative (mercaptide) of 3-pyridine-thiol described in Example 2 were dissolved in 30 cc. of HCl concentrated by heating to the boil. The clear colorless solution was allowed to crystallize while cooling for 24 hours, and then filtered through a fritted glass funnel. The white crystals obtained were dried in a desiccator over NaOH. A double salt which can be represented by the following structural formula is obtained.

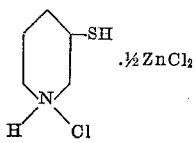

The formation can be explained by the following equation:

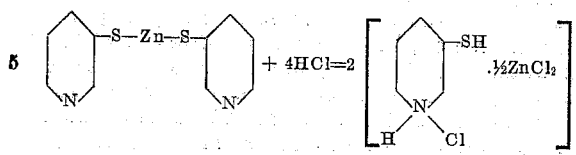

The double salt is soluble in normal HCl and in pyridine.

In a manner similar to that described for the preparation of the zinc, mercury, copper and bismuth mercaptides, there can also be prepared cadmium, ferrous, ferric, lead, gold and the like mercaptiles of 3-pyridine-thiol.

These can be represented by the following formulae:

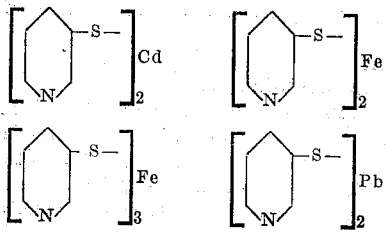

and

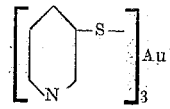

The following examples will serve to illustrate the preparation of compositions such as dusting powders and ointments in which my new compounds are employed as fungicides and bactericides. In general, the compounds are employed in the preparations in any suitable effective amount.

EXAMPLE 7

5 kg. of the zinc derivative of 3-pyridine-thiol and 95 kg. of talcum powder are mixed in porcelain ball mill and milled for 1 hour. The resulting white powder can be readily used as a dusting powder for treatment of fungus skin infections. It is odorless and non-irritating. Instead of talcum, magnesium silicate can also be used as a carrier.

EXAMPLE 8

4 kg. of the zinc derivative of 3-pyridine-thiol, 47.5 kg. of the ointment base above described in the fifth paragraph of the specification, and 48.5 liters of water are mixed in a suitable mechanical ointment mixer until a uniform paste is formed. The ointment obtained can be readily used as a nonirritating ointment for the treatment of fungus infections of the skin.

The strength of the ointment can be increased or decreased, and as a base, there can also be employed lanolin, petroleum jelly, and the like.

The following example will serve to illustrate the preperation of 3-pyridyl-thioglycollic acid:

EXAMPLE 9

*Preparation of 3-pyridyl-thioglycollic acid*

120 grams of the tin-tetrachloride of 3-pyridyl-thiol hydrochloride were added portionwise to a solution of 50 grams of monochloracetic acid, ice and 100 cc. of 40% NaOH with stirring. An additional 95 cc. of 40% NaOH were added to keep the reaction alkaline to phenolphthalein. The reaction mixture was stirred at 50° for two hours, and filtered. The filtrate was made very faintly acid to Congo with conc. HCl and the resulting suspension was chilled in ice. The precipitate was filtered off, the cake was dissolved in 700 cc. of water and 100 g. of sodium acetate, heated to 80° C. and filtered. The cake was washed with 200 cc. of hot water and 5 grams of sodium acetate. The filtrate and washings were made neutral to Congo with about 80 cc. of conc. HCl and cooled. The precipitate was filtered off, washed with cold water and dried in vacuo. There was recovered 3-pyridyl-thioglycollic acid having an M. P. of 170–173° C.

In a similar manner as described in the above example, but employing 3-pyridine-thiol or its hydrochloride, the zinc chloride double salt of 3-pyridine-thiol hydrochloride or the zinc mercaptide, in each instance, the indentical acid was obtained.

I claim:
1. 3-pyridine-thiol.
2. Metal mercaptides of 3-pyridine-thiol.
3. The zinc mercaptide of 3-pyridine-thiol.
4. The method of preparing 3-pyridine-thiol which comprises reducing 3-pyridine-sulfochloride hydrochloride with stannous chloride to form the double salt of tin-tetrachloride and 3-pyridine-thiol hydrochloride, reacting the double salt with sodium sulfide and hydrochloric acid to form the 3-pyridine-thiol hydrochloride and treating the latter with an alkali to form the 3-pyridine-thiol.
5. The method of preparing the zinc mercaptide of 3-pyridine-thiol which comprises reacting 3-pyridine-sulfochloride hydrochloride with stannous chloride to form the double salt of tin-tetrachloride and 3-pyridine-thiol hydrochloride, reacting the double salt with sodium sulfide and hydrochloric acid to form the 3-pyridine-thiol hydrochloride and treating the latter with zinc chloride in the presence of a mineral acid-binding agent.
6. Process as in claim 5 in which the mineral acid-binding agent is sodium acetate.
7. Method of preparing metal mercaptides of 3-pyridine-thiol which comprises reacting 3-pyridine-thiol hydrochloride with a metal salt in the presence of a mineral acid-binding agent.
8. Method of preparing the zinc mercaptide of 3-pyridine-thiol which comprises reacting 3-pyridine-thiol with zinc chloride in the presence of a mineral acid-binding agent.
9. Method of preparing the zinc mercaptide of 3-pyridine-thiol which comprises reacting a 3-pyridine-thiol hydrochloride with zinc chloride in the presence of sodium acetate.
10. A compound selected from the group consisting of 3-pyridine-thiol, the hydrochloride of 3-pyridine-thiol, and metal mercaptides of 3-pyridine-thiol.
11. 3-pyridine-thiol-hydrochloride.
12. The method of preparing 3-pyridine-thiol hydrochloride which comprises reacting the tin-tetrachloride of 3-pyridine-thiol hydrochloride with sodium sulfide and treating the resulting solution with hydrochloric acid.

NORBERT STEIGER.

REFERENCES CITED

The following references are of record in the file of this patent:

UNITED STATES PATENTS

| Number | Name | Date |
|---|---|---|
| 1,753,658 | Kochendoerfer | Aug. 8, 1930 |
| 1,897,516 | Herz | Feb. 14, 1933 |
| 2,372,588 | Larsen | Mar. 27, 1945 |
| 2,429,096 | Ladd | Oct. 14, 1947 |

FOREIGN PATENTS

| Number | Country | Date |
|---|---|---|
| 380,083 | Great Britain | Sept. 5, 1932 |

OTHER REFERENCES

J. Pharm. of Japan, vol. 53, No. 10, Oct. 1933, page 218.

Maier, Das Pyridine und Seine Derivatives, p. 168 (1934).

Gutman, Modern Drug Encyclopedia, 2nd ed., 1941, page 733.

Sidgwick, Organic Chemistry of Nitrogen, p. 516 (1942) Oxford Press.

Suter, Organic Chemistry of Sulfur (J. Wiley and Sons) pp. 496–498.